Oct. 5, 1937.  D. MacINTYRE  2,094,899
VIBRATION DAMPER
Filed April 10, 1933

INVENTOR
DAVID MacINTYRE
BY
ATTORNEY

Patented Oct. 5, 1937

2,094,899

UNITED STATES PATENT OFFICE 2,094,899

VIBRATION DAMPER

David MacIntyre, Pittsburgh, Pa., assignor to Aluminum Company of America, Pittsburgh, Pa., a corporation of Pennsylvania Application April 10, 1933, Serial No. 665,365

6 Claims. (Cl. 173—13)

This invention relates to vibration dampers for electrical transmission lines. It relates particularly to vibration dampers of the type in which an inertia mass is resiliently supported from the transmission line, usually near a point at which the transmission line is supported. Vibration dampers of this general type are disclosed in U. S. Patent No. 1,675,391 to Stockbridge, and in an improved form in a copending application, Serial No. 663,748, filed March 31, 1933 issued as Patent No. 2,058,173, October 20, 1936. In dampers of this type, it is the usual practice to rigidly connect a pair of weights or inertia members to the ends of a resilient member, such as a bar or leaf spring or preferably a short length of stranded metal cable of suitable diameter, and this resilient member is in turn supported by a clamp adapted to engage a transmission line or the like. Dampers of this type are very effective for the purpose for which they are intended so long as they remain intact, but if for any reason the resilient member breaks or is severed, the weight or weights fall to the ground and the damper immediately ceases to perform its intended function.

The principal object of this invention is to provide an improved device for preventing or minimizing the objectionable vibrations which normally occur in suspended transmission lines and the like. Another object of the invention is to provide an improved vibration damper for transmission lines and the like which will be at least partially operative even after the failure of the resilient member, and in which the danger from falling weights is eliminated. Other objects will appear and be more readily understood from the following description taken in connection with the accompanying drawing, in which:

Figure 1:
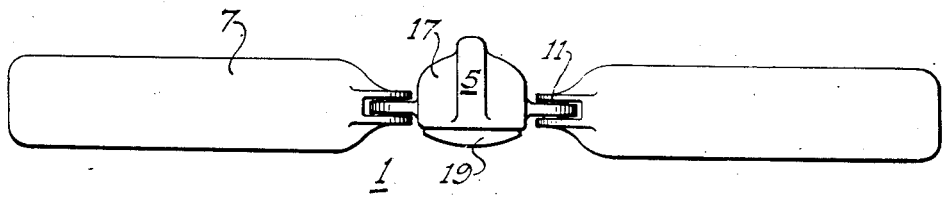
Fig. 1 is a top view of my improved vibration damper.
Figure 2:
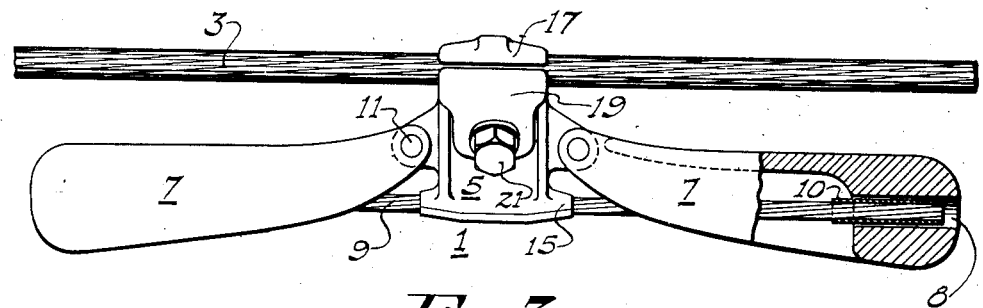
Fig. 2 is a side elevation, with parts broken away, of the improved vibration damper in operative position on a transmission line.
Figure 3:
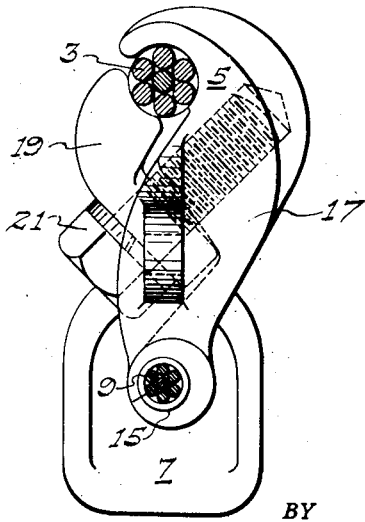
Fig. 3 is an end view of the damper with one of the inertia members removed.

My invention contemplates overcoming the difficulties previously encountered in the event of the failure of the resilient member in a vibration damper of the type described, by providing auxiliary or independent means for supporting the inertia members from the clamping member of the damper. The method of connection and the benefits derived therefrom will now be described in more detail with reference to the drawing, in which similar reference numerals designate similar parts throughout. In the drawing, the improved vibration damper is designated generally by the numeral 1. This damper is connected to a transmission line or conductor 3 by means of a suitable clamp or clamping device 5, a preferred form of which is described in more detail hereinbelow. In its preferred form, the damper comprises two partially hollow inertia members or weights 7, each of which is provided with an aperture 8 adapted to receive the end of a resilient member 9. This resilient member is supported by the clamp 5 and in turn normally supports the inertia members, at least in part. When a stranded cable is used as the resilient member 9, its ends are preferably provided with sleeves 10 which enclose at least the major portion of those parts of the resilient member which are engaged by the apertured portions of the inertia members 7. Each of the weights is also provided with an auxiliary supporting device independent of the resilient member 9, which preferably consists of a hinge or pivot 11.

The structure of the clamping device 5 employed to attach my improved vibration damper to a transmission line or the like may obviously be varied considerably, but a clamp of the form illustrated in the drawing is preferable. This type of clamp consists generally of a lower portion or member 15 adapted to tightly engage the resilient member 9 of the damper and connected to or forming a part of the clamp body 17. The clamp body is provided at or near its upper edge with a hook or grooved face adapted to engage the upper side of a transmission line. Within the clamp body is a suitable recess or channel in which a clamp arm 19 is slidably mounted. This clamp arm has a grooved or recessed face adapted to engage one side of a transmission line in such manner that the transmission line or the like is fixedly engaged between the arm 19 and the clamp body 17 when a clamping bolt or setscrew 21 is tightened. This type of clamp has the advantage that it may be readily attached to or detached from transmission lines even when conducting current, by means of known tools.

The operation and advantages of my improved vibration damper will now be readily understood. When the damper is attached to a transmission line or the like, incipient vibration or similar movement of the transmission line causes a movement of the inertia members 7 relative to the clamp 5. This movement occurs chiefly in a substantially vertical plane, and the path of the weights 7 is arcuate about the ends of the lower portion 15 of the clamp, or about the auxiliary supporting points 11. Throughout this movement the inertia members are supported principally by the resilient member 9, which is preferably a length of stranded metal cable, and it is believed that the damping effect obtained with my device is due largely to the absorption of energy from the vibrating transmission line by work done in flexing this resilient member, the same as with dampers of the types previously referred to. When my improved dampers are so constructed that the auxiliary supports 11 restrain the free movement of the inertia members 7 with the resilient member 9, the apertures 8 are made of such size that their engagement of the ends of the resilient member is not fixed but slidable, and the inertia members then oscillate about the supporting points 11. The fact that in such cases the inertia members are not fixed to the resilient member may lead to a slight reduction in the energy absorbed in flexing the resilient member, but this reduction is generally at least compensated for by the energy absorbed in overcoming friction between the resilient member 9 or the sleeve 10 and the inertia member 7, in the aperture 8. Friction in the hinge or joint 11 may also contribute to this effect, but the structure at this point is preferably such that the friction is negligible.

If the resilient member of my improved vibration damper breaks on one side of the clamp, the corresponding inertia member remains suspended from the clamp but substantially perpendicular to its normal position, so that it serves as a clearly visible signal that repairs are needed. In the meantime the other inertia member will continue to function as usual, so that the damper will still be at least partially effective. Even if the resilient member fails on both sides of the clamp, so that both inertia members remain suspended in a substantially vertical position from their auxiliary supports 11, the damper may still be effective under certain conditions. In any event, the inertia members are prevented from falling. A further advantage of my damper construction is that the resilient member 9 is so shielded by the hollow, substantially U-shaped portion of my preferred form of inertia member that its life is prolonged.

My invention has been described and illustrated hereinabove with special reference to what is now considered its preferred embodiment, but it is to be understood that it may be otherwise embodied within the scope of the appended claims without departing from the spirit of my invention.

I claim as my invention:

1. A vibration damper comprising a clamping member adapted to engage a transmission line, a resilient member supported by said clamping member and having its ends provided with sleeves, apertured inertia members normally supported by said resilient member, said sleeves slidably engaging said inertia members within the apertures thereof, and means adapted to support said inertia members independently of their normal resilient support, said last-mentioned means having a substantially oscillatable connection between said inertia members and said clamping device.

2. In a vibration damper, the combination of a resilient member, means adapted to support said resilient member from a transmission line, and apertured inertia members supported by said resilient member and being connected to said means and movable relative thereto, portions of said resilient member extending into the apertures in said inertia members in movable frictional engagement therewith.

3. A vibration damper for transmission lines comprising a plurality of apertured inertia members supported by a resilient member, said resilient member having portions extending into said apertures in movable frictional engagement therewith, means adapted to attach said resilient member to a transmission line, and means pivotally connecting said inertia members to said first mentioned means, thereby permitting relative movement between said inertia members and said first mentioned means.

4. A vibration damper for transmission lines comprising a resilient member, apertured inertia members having movable frictional engagement with said resilient member within the apertures and being partially supported by said resilient member, means adapted for attachment to a transmission line secured to said resilient member intermediate its ends, and means for supporting said inertia members from said first mentioned means independently of said resilient member thereby permitting relative movement between said inertia members and said first mentioned means.

5. A vibration damper for transmission lines comprising means adapted to engage a transmission line, a resilient member supported intermediate its ends by said means, the ends of said member being free and substantially equidistant from the point of support, a pair of inertia members having longitudinal apertures and adapted to movably and frictionally engage the ends of said resilient member within the apertures and being at least partially supported thereby, means for supporting said inertia members from said first-mentioned means independently of said resilient member, thereby permitting relative movement between said inertia members and said first mentioned means.

6. A vibration damper for transmission lines, comprising a clamping member adapted to rigidly engage a transmission line, a short resilient length of metal cable having its ends provided with sleeves and supported intermediate its ends by said clamping member, a pair of apertured inertia members, and means for pivotally connecting said members to said clamping member above said cable with the apertures therein slidably engaging the sleeved ends of the cable.

DAVID MacINTYRE.